(12) United States Patent
Samara-Rubio et al.

(10) Patent No.: US 7,231,150 B2
(45) Date of Patent: Jun. 12, 2007

(54) METHOD AND APPARATUS FOR SENSING A TEMPERATURE ALONG AN OPTICAL PATH IN SEMICONDUCTOR MATERIAL

(75) Inventors: Dean A. Samara-Rubio, San Jose, CA (US); Andrew C. Alduino, San Jose, CA (US); Christina A. Frost, Ann Harbor, MI (US)

(73) Assignee: Intel Corporation, Santa Clara, CA (US)

( * ) Notice: Subject to any disclaimer, the term of this patent is extended or adjusted under 35 U.S.C. 154(b) by 690 days.

(21) Appl. No.: 10/279,398

(22) Filed: Oct. 23, 2002

(65) Prior Publication Data
US 2004/0081223 A1    Apr. 29, 2004

(51) Int. Cl.
*H04J 14/02* (2006.01)
(52) U.S. Cl. .............................. 398/84; 398/87; 398/90
(58) Field of Classification Search ............ 398/83–84, 398/87, 90; 385/12, 31, 37, 123–129
See application file for complete search history.

(56) References Cited
U.S. PATENT DOCUMENTS 5,987,200 A * 11/1999 Fleming et al. ............... 385/37
6,044,190 A * 3/2000 Kashyap ...................... 385/123
6,778,734 B2 * 8/2004 Baldwin et al. ............... 385/37

* cited by examiner

*Primary Examiner*—Dzung Tran
(74) *Attorney, Agent, or Firm*—Blakely, Sokoloff, Taylor & Zafman LLP (57) ABSTRACT

A temperature sensing and control method and apparatus. In one aspect of the present invention, an apparatus according to the teachings of the present invention includes an optical path disposed in semiconductor material. A four-terminal resistor is defined in the semiconductor material. At least a portion of the optical path is directed through the four-terminal resistor. The four-terminal resistor includes a first pair of terminals between which a probe current is to be injected. The four-terminal resistor also includes a second pair of terminals between which a voltage drop is to be measured so as to determine a resistance along the portion of the optical path directed through the four-terminal resistor. Temperature may be derived from the determined resistance of the four-terminal resistor. In one embodiment, the temperature of the semiconductor material may then be controlled with a heater in response to the derived temperature.

26 Claims, 5 Drawing Sheets

METHOD AND APPARATUS FOR SENSING A TEMPERATURE ALONG AN OPTICAL PATH IN SEMICONDUCTOR MATERIAL

BACKGROUND OF THE INVENTION

1. Field of the Invention

The present invention relates generally to optical devices and, more specifically, the present invention relates to Bragg grating optical devices.

2. Background Information

The need for fast and efficient optical-based technologies is increasing as Internet data traffic growth rate is overtaking voice traffic pushing the need for optical communications. Commonly used optical components include diffraction gratings, thin-film filters, fiber Bragg gratings, and arrayed-waveguide gratings.

A fiber Bragg grating is an optical fiber device that includes an optical fiber with periodic changes in the refractive index of fiber core materials along the fiber length, which may be formed by exposure of the photosensitive core to an intense optical interference pattern. With the changes in the refractive index along the fiber length, optical beams at a particular wavelength are reflected by the fiber Bragg grating while other wavelengths are allowed to propagate through the fiber.

A limitation with known fiber Bragg gratings is that the particular wavelength that is reflected by the fiber Bragg grating is substantially fixed. Consequently, if different wavelengths of light are to be reflected, different fiber Bragg gratings are utilized. In some known fiber Bragg gratings, nominal adjustments to the reflected wavelength may be provided by physically or mechanically stretching the optical fiber of the fiber Bragg grating to modify the length of the optical fiber. The disadvantage of this technique is that the amount of adjustment to the reflected wavelength is relatively small and the optical fiber may suffer damage from the physical stress and strain of the stretching.

BRIEF DESCRIPTION OF THE DRAWINGS

The present invention is illustrated by way of example and not limitation in the accompanying figures.

DETAILED DESCRIPTION

Methods and apparatuses for sensing a temperature of an optical path disposed in semiconductor material are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, the temperature of an optical path included in semiconductor material can be sensed using an optically transparent four-terminal resistor defined in the semiconductor material along the optical path. In one embodiment, the optical path includes a semiconductor-based tunable Bragg grating, which is provided in a fully integrated solution on a single integrated circuit chip. In one embodiment, an infrared or near infrared input optical beam is selectively reflected at a tunable Bragg wavelength or center wavelength with a silicon-based optical grating or filter in accordance with the teachings of the present invention. As will be discussed, the reflected wavelength bandwidth is relatively narrow. In one embodiment, the Bragg wavelength of the optical grating is controlled using a heater and the thermal optic effect in for example silicon. Embodiments of the presently described semiconductor-based tunable Bragg grating may be utilized in broadband optical networking systems or the like.

Figure 1:
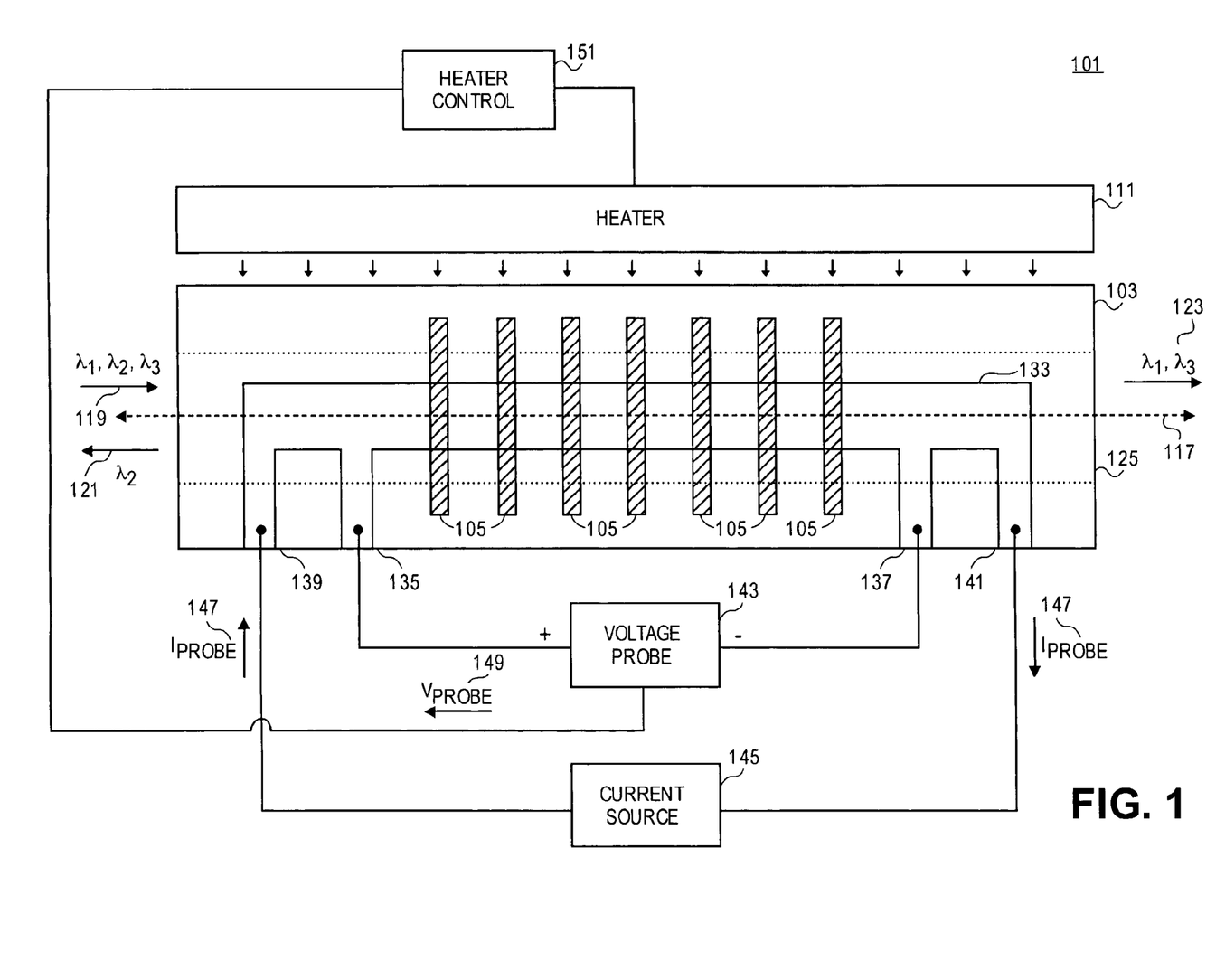
FIG. 1 is a block diagram illustrating a cross section of one embodiment of an optical path disposed in semiconductor material including a four-terminal resistor used to sense a temperature in a tunable Bragg grating in accordance with the teachings of the present invention.

To illustrate, FIG. 1 is a block diagram illustrating a cross section of one embodiment of a semiconductor-based tunable Bragg grating 101 with a four-terminal resistor disposed in semiconductor material 103 in accordance with the teachings of the present invention. As shown in the depicted embodiment, a waveguide 125 is disposed in semiconductor material 103 such that an optical path 117 along waveguide 125 is directed through semiconductor material 103 as shown.

In one embodiment, a region along waveguide 125 is lightly doped so as to form a four-terminal resistor 133 along waveguide 125 in semiconductor material 103. In one embodiment, the starting material for semiconductor material 103 is substantially undoped silicon such that semiconductor material 103 has a substantially high resistivity relative to the lightly doped region of four-terminal resistor 133. As shown in the depicted embodiment, four-terminal resistor 133 includes a pair of outer terminals 139 and 141 and a pair of inner terminals 135 and 137, which are disposed between the outer terminals 139 and 141.

In one embodiment, a temperature sensor including four-terminal resistor 133, as well as voltage probe 143 and a current source 145, are provided to sense the temperature along optical path 117 in semiconductor material 103. A current source 145 is coupled to the outer pair of terminals 139 and 141 to inject a probe current $I_{PROBE}$ 147 into four-terminal resistor 133, which is directed through four-terminal resistor 133 along optical path 117. Since the starting material of semiconductor material 103 has a substantially high resistivity relative to the resistivity of the lightly doped material of four-terminal resistor 133, probe current $I_{PROBE}$ 147 is substantially confined to flow only through four-terminal resistor 133 between outer terminals 139 and 141. A voltage probe 143 is coupled to inner terminals 135 and 137 to sense the voltage drop $V_{PROBE}$ 149 across four-terminal resistor 133 between inner terminals 135 and 137. In one embodiment, voltage probe 143 has a high output impedance such that substantially no probe current $I_{PROBE}$ 147 flows through voltage probe 143.

In operation, the resistance $R_{SENSE}$ through four-terminal resistor 133 can then be determined using Ohm's law by dividing $V_{PROBE}$ 149 by $I_{PROBE}$ 147:

$$R_{SENSE} = \frac{V_{PROBE}}{I_{PROBE}} \quad \text{(Equation 1)}$$

In one embodiment, the temperature along optical path 117 in waveguide 125 can then be directly determined based on the measured resistance $R_{SENSE}$ based on known resistance versus temperature characteristics of semiconductor material 103. For example, the change in resistivity with respect to temperature in polycrystalline silicon is given in Equation 2

$$\frac{d\rho}{dT} \approx T^{\frac{1}{2}} e^{qV_{bo}/kT} \quad \text{(Equation 2)}$$

where $\rho$ is the resistivity of the polycrystalline silicon, T is the temperature, q is the electron charge, $V_{bo}$ the band offset voltage and k is Boltzman's constant. Knowing the length (L) and the cross-sectional area (A) of the temperature sensing resistor and using the relationship in Equation 3 it is possible to calculate the temperature of the waveguide core.

$$R = \frac{\rho L}{A} \quad \text{(Equation 3)}$$

The sensitivity of this technique to changes in temperature will be determined by the relative change in the resistance and the dependence of the relative resistance to the change in temperature is described by Equation 4.

$$\left(\frac{1}{R}\right) * \left(\frac{dR}{dT}\right) \quad \text{(Equation 4)}$$

The change in the relative resistance is approximately equal to 0.025/° K. for a semiconductor material 103 that includes polycrystalline silicon material, compared to for example 0.002/° K. for single crystal silicon. Thus, it is appreciated that polycrystalline silicon is an example of a suitable material according to embodiments of the present invention because of its strong temperature dependence compared to some other materials. For example, assuming that in one embodiment a 12 bit analog to digital converter (ADC) is coupled to receive $V_{PROBE}$ 149 from voltage probe 143, the least significant bit (LSB) of the ADC translate into increments of approximately 0.1° K.

Therefore, in one embodiment, the temperature along the optical path 117 of waveguide 125 in semiconductor material 103 may be sensed in accordance with the teachings of the present invention by employing a four-terminal resistance measurement as discussed above. It is of course appreciated that other embodiments of the present invention may employ different semiconductor materials that may exhibit different specific relative resistance changes and that ADCs having different bit resolutions or other analog solutions may be employed in accordance with the teachings of the present invention.

In the embodiment depicted in FIG. 1, regions 105 are disposed in semiconductor material 103 to form a grating along waveguide 125. As can be appreciated from FIG. 1, the material from which the grating is made is also the material used for temperature sensing according to embodiments of the present invention. For explanation purposes, it will be assumed that regions 105 include polysilicon material and that semiconductor material 103 includes single crystal silicon. However, it is appreciated that materials or combinations of materials may be used in place of semiconductor material 103 and regions 105 in accordance with the teachings of the present invention. For example, other materials systems such as Ge/SiGe or other suitable materials may be utilized for semiconductor material and regions 105 in accordance with the teachings of the present invention. Furthermore, in one embodiment, regions 105 may include the same material as semiconductor material 103, but have strain applied so as to affect the index of refraction of regions 105 relative to the index of refraction of semiconductor material 103.

Referring back to the embodiment depicted in FIG. 1, regions 105 are disposed in a semiconductor material 103 such that periodic or quasi-periodic perturbations in an effective index of refraction $n_{eff}$ are provided along an optical path 117 through semiconductor material 103. In an embodiment in which silicon and polysilicon are utilized for semiconductor material 103 and regions 105, having effective refractive indexes of $n_{Si}$ and $n_{poly}$, respectively, a small effective refractive index difference $\Delta n_{eff}$(or $n_{poly-nSi}$) is provided at each interface between semiconductor material 103 and polysilicon 105. In one embodiment, $\Delta n_{eff}$ is approximately within the range of 0.005 to 0.01. It is appreciated that other value ranges for $\Delta n_{eff}$ may be utilized in accordance with the teachings of the present invention and that 0.005 to 0.01 is provided herewith for explanation purposes.

As can be appreciated, a grating is therefore formed along optical path 117 of waveguide 125 with the periodic or quasi-periodic perturbations in the effective index of refraction provided with semiconductor material 103 and regions 105. The material from which the grating is made is also the material used for temperature sensing according to embodiments of the present invention.

Figure 2:
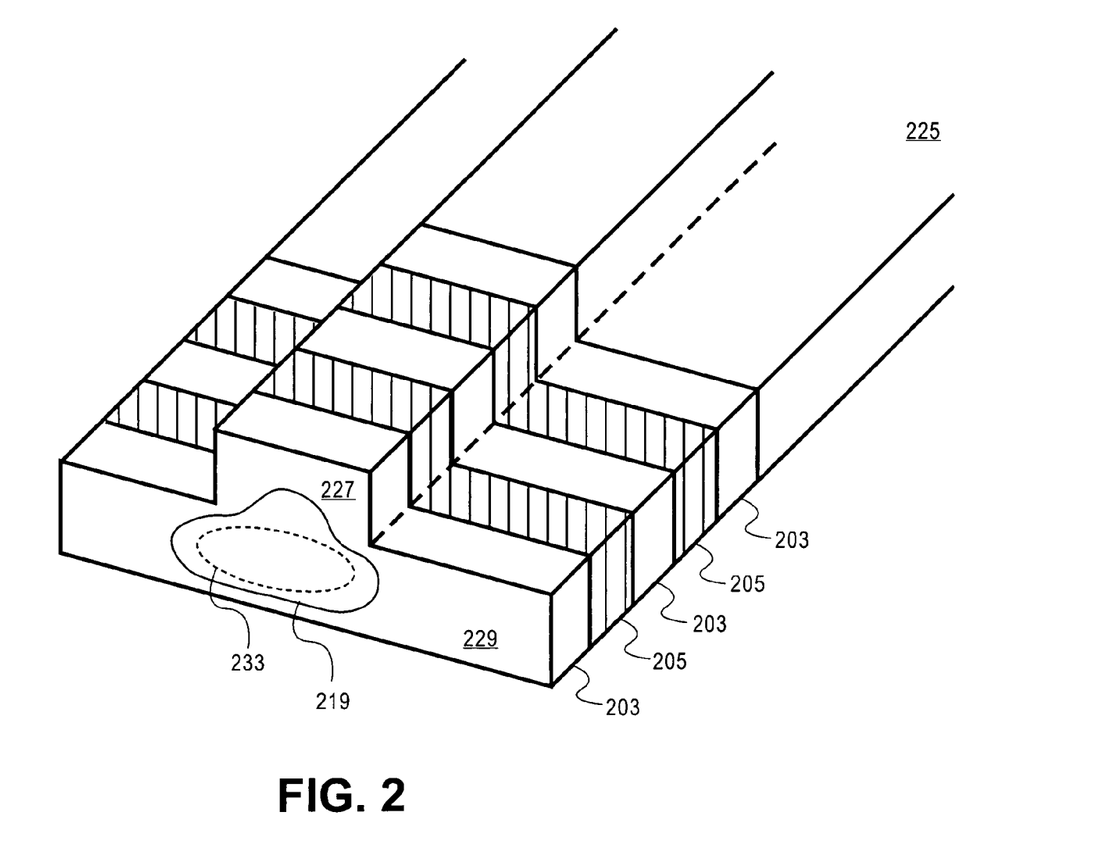
FIG. 2 is a perspective diagram illustrating one embodiment of a tunable Bragg grating with a four-terminal resistor disposed in semiconductor material including a rib waveguide disposed in the semiconductor material in accordance with the teachings of the present invention.

In one embodiment, waveguide 125 is a rib waveguide. To illustrate, FIG. 2 is a perspective view illustration of one embodiment of a rib waveguide 225 of a tunable Bragg grating in accordance with the teachings of the present invention. In one embodiment, rib waveguide 225 is disposed between higher refractive index SiO regions on a silicon on insulator (SOI) wafer in accordance with the teachings of the present invention. In one embodiment, the insulating region of the SOI serve as a bottom cladding and a deposited layer of SiO serves as the top cladding so as to help confine an optical beam to remain within rib waveguide 225. As shown in FIG. 2, rib waveguide 225 is disposed in semiconductor material 203 and includes regions of polysilicon 205. According to embodiments of the present invention, the semiconductor substrate 203 has a different index of refraction than polysilicon 205 such that periodic or quasi-periodic perturbations in an effective index of refraction are provided along an optical path through rib waveguide 225.

As shown, the rib waveguide 225 includes a rib region 227 and a slab region 229. In the embodiment illustrated in FIG. 2, the intensity distribution of a single mode optical beam 219 is shown propagating through the rib waveguide 225. As shown, the intensity distribution of optical beam 219 is such that of the majority of the optical beam 219 propagates through a portion of rib region 227 towards the interior of the rib waveguide 225. In addition, a portion of optical beam 219 propagates through a portion of slab region 229 towards the interior of the rib waveguide 225. As also shown with the intensity distribution of optical beam 219, the intensity of the propagating optical mode of beam 219 is vanishingly small at the "upper corners" of rib region 227 as well as the "sides" of slab region 229.

FIG. 2 also shows a cross-section of one embodiment of the lightly doped region of four-terminal resistor 233 disposed in substantially undoped semiconductor material 203. As illustrated in the depicted embodiment, four-terminal resistor 233 is positioned in waveguide 225 near the center of the intensity distribution of the single mode optical beam 219. Accordingly, the temperature that is sensed in accordance with the teachings of the present invention is substantially the temperature of semiconductor material 203 along the optical path of waveguide 225. In one embodiment, contacts that are used to coupled inner terminals 135 and 137 and outer terminals 139 and 141 to the lightly doped region of four-terminal resistor 233 are disposed in semiconductor material 203 outside the optical path of optical beam 219.

Referring back to the embodiment illustrated in FIG. 1, an optical beam 119 is directed along optical path 117 into one end of waveguide 125. In one embodiment, optical beam 119 includes infrared or near infrared light having a plurality of wavelengths including for example $\lambda_1$, $\lambda_2$ and $\lambda_3$. It is appreciated that although optical beam 119 has been illustrated to include three wavelengths $\lambda_1$, $\lambda_2$ and $\lambda_3$ in the illustrated example, a different number of wavelengths may be included in optical beam 119 in accordance with the teachings of the present invention.

As mentioned above, there are periodic or quasi-periodic perturbations in the effective index of refraction along optical path 117 through waveguide 125. As a result of the effective refractive index difference $\Delta n_{eff}$ described above, a multiple reflection of optical beam 119 occurs at the interfaces between semiconductor material 103 and regions 105 along optical path 117. In one embodiment, a Bragg reflection occurs when a Bragg condition or phase matching condition is satisfied. In particular, for uniform Bragg gratings, when the condition $$m\lambda_B = 2n_{eff}\Lambda, \quad \text{(Equation 5)}$$

is satisfied, where m is the diffraction order, $\lambda_B$ is the Bragg wavelength, $n_{eff}$ is the effective index of the waveguide and $\Lambda$ is the period of the grating, a Bragg reflection occurs.

To illustrate, FIG. 1 shows a Bragg condition existing for $\lambda_B$ equal to $\lambda_2$. Accordingly, an optical beam 121 including wavelength $\lambda_2$ is shown to be reflected back out of the waveguide 125 out from the end into which optical beam 119 is directed. In addition, the remainder of optical beam 119 continues to propagate along optical path 117 through waveguide 125 such that the remaining wavelengths (e.g. $\lambda_1$ and $\lambda_3$) are included in optical beam 123, which is propagated from the opposite end of waveguide 125. Accordingly, the Bragg wavelength $\lambda_2$ is filtered from optical beam 123. In one embodiment, optical beam 119 may be an optical communications beam or the like on which data is encoded. In one embodiment, wave division multiplexing (WDM) or dense wave division multiplexing (DWDM) or the like may be employed with optical beam 119 such that a different channel is encoded with each of the wavelengths (e.g. $\lambda_1$, $\lambda_2$, $\lambda_3$, etc.) included in optical beam 119.

In one embodiment, the Bragg wavelength, $\lambda_B$, that is reflected or filtered by tunable Bragg grating 101 is tunable or adjustable with a heater 111 disposed proximate to waveguide 125. In an embodiment, heater 111 includes a thin-film heater or the like or other future arising technology that is thermally coupled to semiconductor material 103. In the depicted embodiment, heater 111 controls the temperature of semiconductor material 103 and regions 105 in waveguide 125 along optical path 117. For instance, assume for explanation purposes that semiconductor material 103 includes silicon and regions 105 include polysilicon. Silicon and polysilicon have large index of refraction variations with temperature on the order of approximately $1\times10^{-4}/^\circ$K. It is appreciated that the index of refraction variations with temperature for semiconductor materials such as silicon and/or polysilicon are two orders of magnitude greater than other materials such as for example silica or the like. Thus, by controlling the temperature of semiconductor material 103 and polysilicon 105, relatively significant shifts in the center wavelength of light reflected by a tunable Bragg grating 101 are provided in accordance with the teachings of the present invention.

As shown in the depicted embodiment, heater 111 is adapted to monitor or sense the temperature of semiconductor material 103 by receiving the measured voltage receive $V_{PROBE}$ 149 from voltage probe 143. In one embodiment, a heater control 151 is coupled to receive $V_{PROBE}$ 149, which is adapted to derive temperature information from $V_{PROBE}$ 149 and control the temperature of semiconductor material 103 accordingly with heater 111. In one embodiment, heater control 151 may be integrated in heater 111, integrated in the same chip with semiconductor material 103 or may be implemented in a separate chip from semiconductor material 103. In one embodiment, heater 111 may include an ADC and/or other suitable circuitry to derive the temperature information from $V_{PROBE}$ 149 and control heater 111 to control the temperature of semiconductor material 103.

Figure 3:
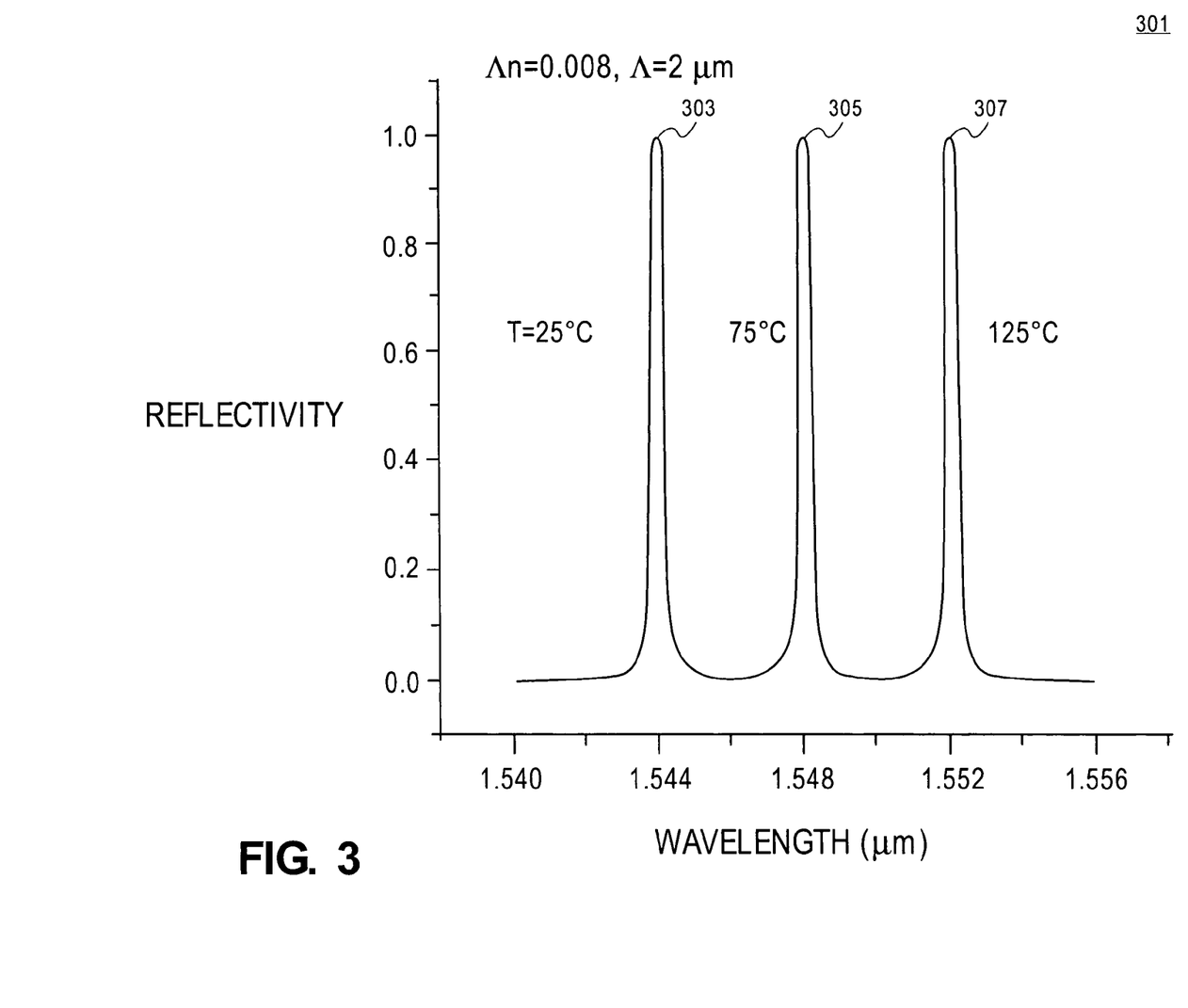
FIG. 3 is a diagram illustrating the relationship between reflectivity and wavelength at different temperatures of one embodiment of a tunable Bragg grating in accordance with the teachings of the present invention.

FIG. 3 is a diagram 301 that illustrates the relationship between reflectivity and wavelength at different temperatures of one embodiment of a tunable Bragg grating 101 in accordance with the teachings of the present invention. In the illustrated example, heater 111 is used to adjust the temperature of one embodiment of a silicon/polysilicon waveguide Bragg grating to 25° C., 75° C. and 125° C. In the illustrated embodiment, the difference in the effective indexes of refraction between the silicon and polysilicon $\Delta n_{eff}$ is approximately 0.008 and the period of the grating $\Lambda$ is approximately 2 μm.

Plot 303 shows that at 25° C., the center wavelength of an optical beam that is reflected by the silicon/polysilicon waveguide Bragg grating is approximately 1.544 µm in the illustrated embodiment. In comparison, plot 305 shows that at 75° C., the center wavelength of an optical beam that is reflected is shifted or tuned to be approximately 1.548 µm, while plot 307 shows that at 125° C., the center wavelength of an optical beam that is reflected is shifted or tuned to be approximately 1.552 µm. In one embodiment, a thin-film heater utilized for heater 111 provides center wavelength tuning speeds in the order of microseconds It is appreciated of course that the materials, dimensions, wavelengths and index of refraction values utilized in the embodiment illustrated in FIG. 3 are provided for explanation purposes and that other materials, dimensions, wavelengths and index of refraction values may be utilized in accordance with the teachings of the present invention.

Figure 4A:
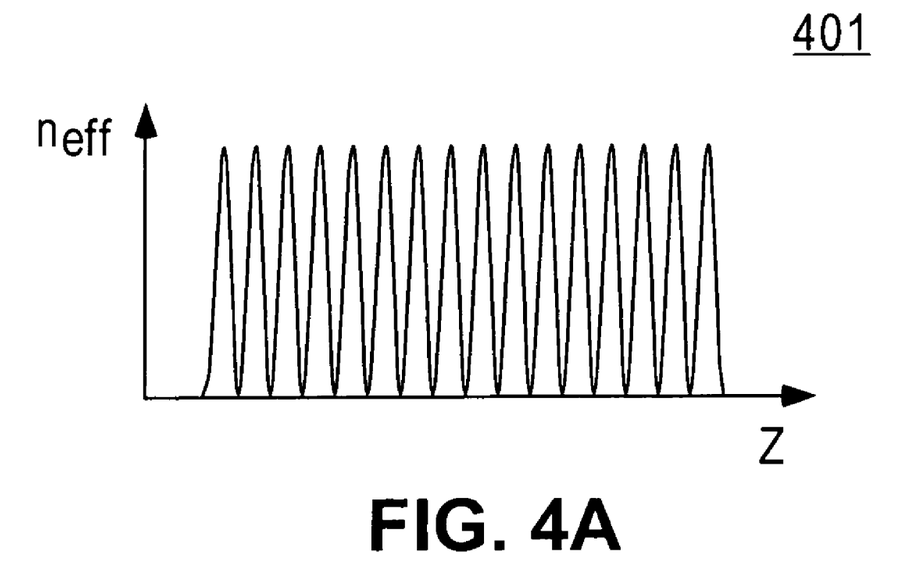
FIG. 4A is a diagram illustrating the effective index of refraction along an optical path of one embodiment of a tunable uniform Bragg grating in accordance with the teachings of the present invention.

In one embodiment, there are side lobes on the sides of each maxima of plots 303, 305 and 307. When uniform or periodic Bragg gratings are utilized, the side lobes may be significantly large. An example of a uniform grating with periodic perturbations in the effective index of refraction along the optical path of the Bragg grating is illustrated in diagram 401 in FIG. 4A. As shown along the y-axis, the effective index of refraction $n_{eff}$ is perturbed periodically or regularly down the optical path, which shown as Z along the x-axis of diagram 401.

Figure 4B:
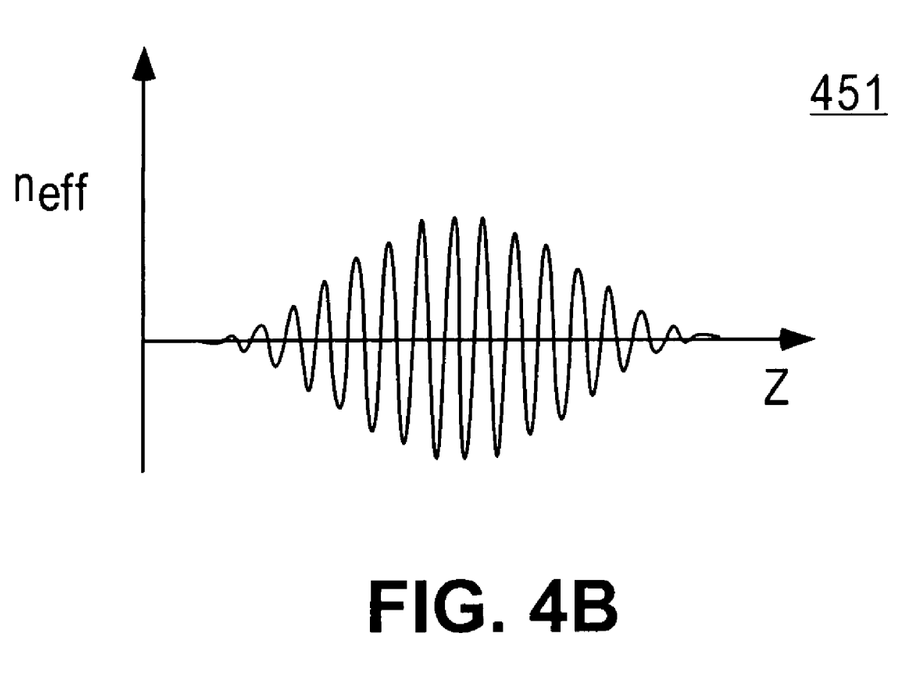
FIG. 4B is a diagram illustrating the effective index of refraction along an optical path of one embodiment of a tunable apodized Bragg grating in accordance with the teachings of the present invention.

In one embodiment, an apodized Bragg grating is provided in accordance with the teachings of the present invention, which reduces the side lobes on the sides of each maxima of plots 303, 305 and 307. One embodiment of an apodized grating utilized in accordance with the teachings of the present invention is illustrated in diagram 451 of FIG. 4B. An apodized grating is provided with quasi-periodic perturbations in the effective index of refraction along the optical path of the Bragg grating. The perturbation in the effective index of refraction can be realized by either changing refractive index of constitutive materials or varying layer widths (duty cycle) along the Bragg grating. It is noted that an embodiment of a raised-cosine apodized grating is illustrated in diagram 451 of FIG. 4B. It is appreciated that other types of apodized gratings may be utilized in accordance with the teachings of the present invention including but not limited to Gaussian-apodized, chirped, discrete phase shift, superstructure or the like.

Figure 5:
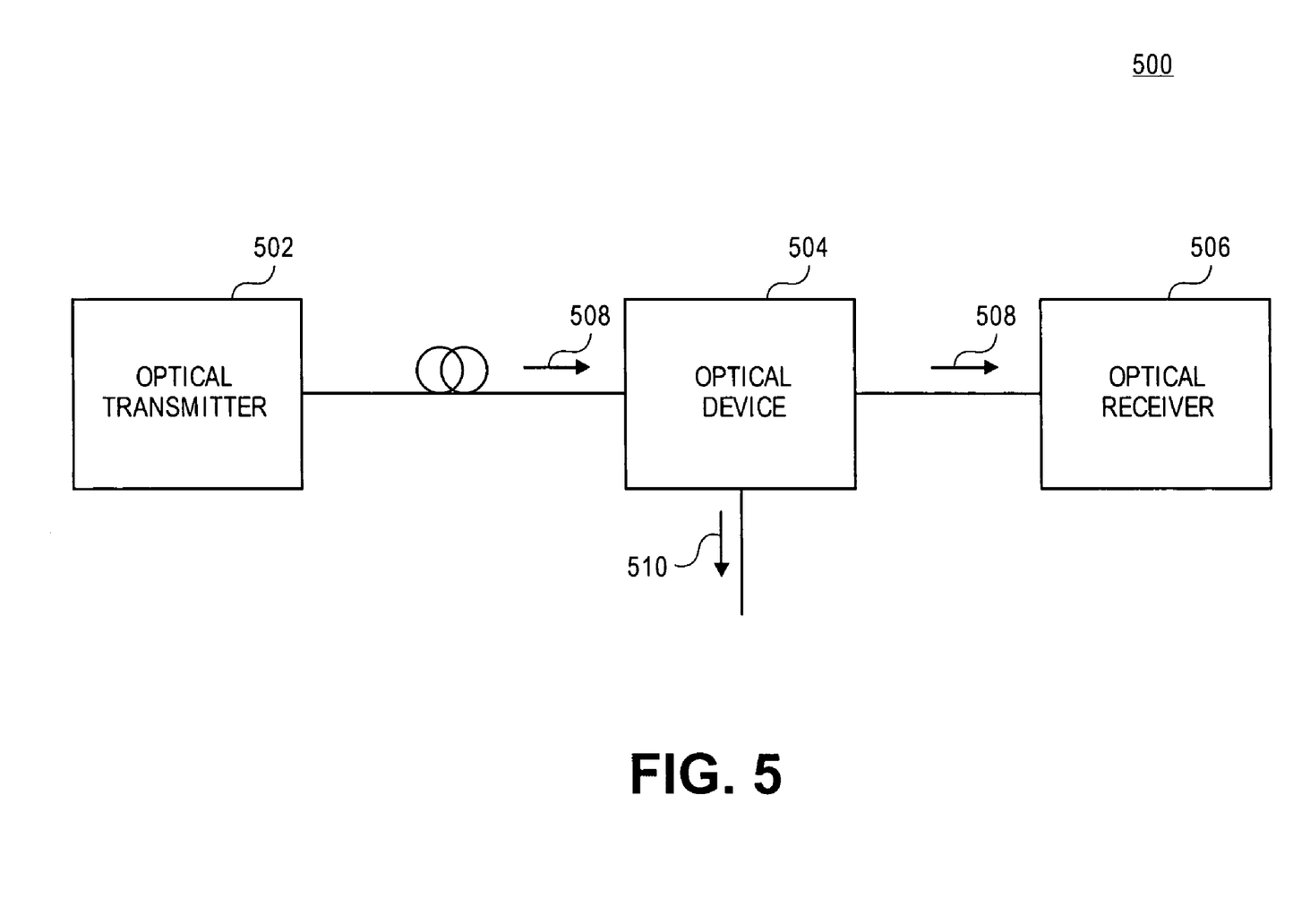
FIG. 5 is a block diagram illustration of one embodiment of a system including an optical transmitter and an optical receiver with an optical device according to embodiments of the present invention.

FIG. 5 is a diagram illustrating one embodiment of an optical communication system 500 including an optical device 504 in accordance with the teachings of the present invention. In various embodiments, optical device 504 may include a tunable Bragg grating with temperature sensing and control, such as for example one similar to any of the embodiments described above with respect to FIGS. 1–4B in accordance with the teachings of the present invention. In the depicted embodiment, optical communication system 500 includes an optical transmitter 502 to transmit an optical beam 508. An optical receiver 506 is optically coupled to receive optical beam 508. It is appreciated that optical transmitter 502 and optical receiver 506 may also include optical transceivers and therefore have both transmitting and receiving capabilities for bi-directional communications.

In one embodiment, optical device 504 is optically coupled between optical transmitter 502 and optical receiver 506. In the illustrated embodiment, optical device 504 is shown to be at the receiving end of optical communication system 500. In other embodiments, optical device 504 may be disposed at various locations along a transmission path or at the transmitting end of optical communication system 500. In one embodiment, the tunable Bragg grating included in optical device 504 may be utilized in for example an add/drop filter enabling the addition or extraction of a channel from a wave division multiplexed (WDM) optical beam 508 transmitted from optical transmitter 502 along an optical path. Thus, an optical beam 510 having a specific wavelength is output from optical device 504.

It is appreciated of course that optical communication system 500 is an illustration of one example of an optical device 504 that includes a temperature sensing and control device in accordance with the teachings of the present invention. In other embodiments, optical communication system 500 may include other types of optical devices that include temperature sensing and control in an optical waveguide in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   an optical path comprised of a semiconductor material; and
   a four-terminal resistor comprised of the semiconductor material of the optical path such that at least a portion of the optical path is directed through the semiconductor material of the four-terminal resistor, the four-terminal resistor including a first pair of terminals between which a probe current is to be injected, the four-terminal resistor including a second pair of terminals between which a voltage drop is to be measured so as to determine a resistance along the portion of the optical path directed through the four-terminal resistor.

2. The apparatus of claim 1 further comprising a heater thermally coupled to the semiconductor material to control a temperature of the optical path comprised of the semiconductor material, the temperature of the optical path determined in response to the resistance along the portion of the optical path directed through the four-terminal resistor.

3. The apparatus of claim 2 further comprising a Bragg grating disposed in the semiconductor material along the optical path, the Bragg grating having a Bragg wavelength responsive to the temperature of the optical path.

4. The apparatus of claim 1 further comprising an optical waveguide disposed in the semiconductor material, the optical waveguide including the optical path and the four-terminal resistor, the four-terminal resistor disposed substantially near a center of an optical mode of the optical waveguide.

5. The apparatus of claim 4 wherein the optical waveguide includes a rib waveguide.

6. The apparatus of claim 1 wherein the four-terminal resistor comprises a doped region defined within a substantially undoped region of the semiconductor material.

7. The apparatus of claim 6 wherein the second pair of terminals is coupled to the doped region between the first pair of terminals.

8. The apparatus of claim 1 further comprising a probe current source coupled to the first pair of terminals to inject the probe current.

9. The apparatus of claim 1 further comprising a voltage sensor coupled to the second pair of terminals to measure the voltage drop across the four-terminal resistor.

10. The apparatus of claim 1 wherein the semiconductor material includes silicon.

11. The apparatus of claim 1 wherein the semiconductor material includes polycrystalline silicon.

12. The apparatus of claim 1 wherein the semiconductor material includes periodic or quasi-periodic arrangements of silicon and polycrystalline semiconductor.

13. The apparatus of claim 1 wherein the semiconductor material includes Ge/SiGe materials.

14. A method, comprising:
   directing an optical beam through an optical path comprised of a semiconductor material;
   measuring a resistance of a four-terminal resistor comprised of the semiconductor material of the optical path such that at least a portion of the optical path is directed through the semiconductor material of the four-terminal resistor; and
   determining a temperature of the optical path in response to the measured resistance of the four-terminal resistor.

15. The method of claim 14 further comprising reflecting at least a portion of the optical beam having a Bragg wavelength.

16. The method of claim 14 further comprising controlling the temperature of the semiconductor material in response to the measured resistance of the four-terminal resistor.

17. The method of claim 16 further comprising:
   reflecting at least a portion of the optical beam having a Bragg wavelength; and
   tuning the Bragg wavelength in response to controlling the temperature of the semiconductor material.

18. The method of claim 14 wherein measuring the resistance of the four-terminal resistor comprises:
   injecting probe current through outer terminals of the four-terminal resistor; and
   measuring a voltage drop across inner terminals of the four-terminal resistor.

19. A system, comprising:
   an optical transmitter to transmit an optical beam;
   an optical device optically coupled to the optical transmitter to receive the optical beam, the optical device including
   an optical path comprised of a semiconductor material, the optical beam to be directed through the optical path;
   a Bragg grating disposed in the semiconductor material along the optical path, the Bragg grating to reflect a portion of the optical beam having a Bragg wavelength;
   a heater thermally coupled to the semiconductor material so as to control a temperature of the Bragg grating to control the Bragg wavelength;
   a temperature sensor comprised of the semiconductor material of the optical path and coupled to the heater, the temperature sensor including a four-terminal resistor disposed within the optical path in the semiconductor material such that the optical beam is to be directed through the semiconductor material of the four-terminal resistor; and
   an optical receiver optically coupled to the optical device to receive at least a portion of the optical beam.

20. The system of claim 19 wherein the temperature sensor further comprises a current source coupled to the four-terminal resistor to inject a probe current through the four-terminal resistor.

21. The system of claim 20 wherein the temperature sensor further comprises a voltage sensor coupled to the four-terminal resistor to measure a voltage drop across the four-terminal resistor to measure a resistance to determine the temperature of the Bragg grating.

22. The system of claim 19 wherein the four-terminal resistor includes a doped region disposed within a substantially undoped region of the semiconductor material.

23. The system of claim 19 wherein the optical receiver is optically coupled to receive the portion of the optical beam having the Bragg wavelength.

24. The system of claim 19 wherein the optical receiver is optically coupled to receive a portion of the optical beam not including the Bragg wavelength.

25. The system of claim 19 wherein the optical device includes an optical waveguide disposed in the semiconductor material through which the optical path is directed, the Bragg grating disposed within the optical waveguide.

26. The system of claim 25 wherein the optical device has an insulating material disposed proximate to the optical waveguide to confine the optical beam to remain within the optical waveguide.

* * * * *